United States Patent Office 3,323,949
Patented June 6, 1967

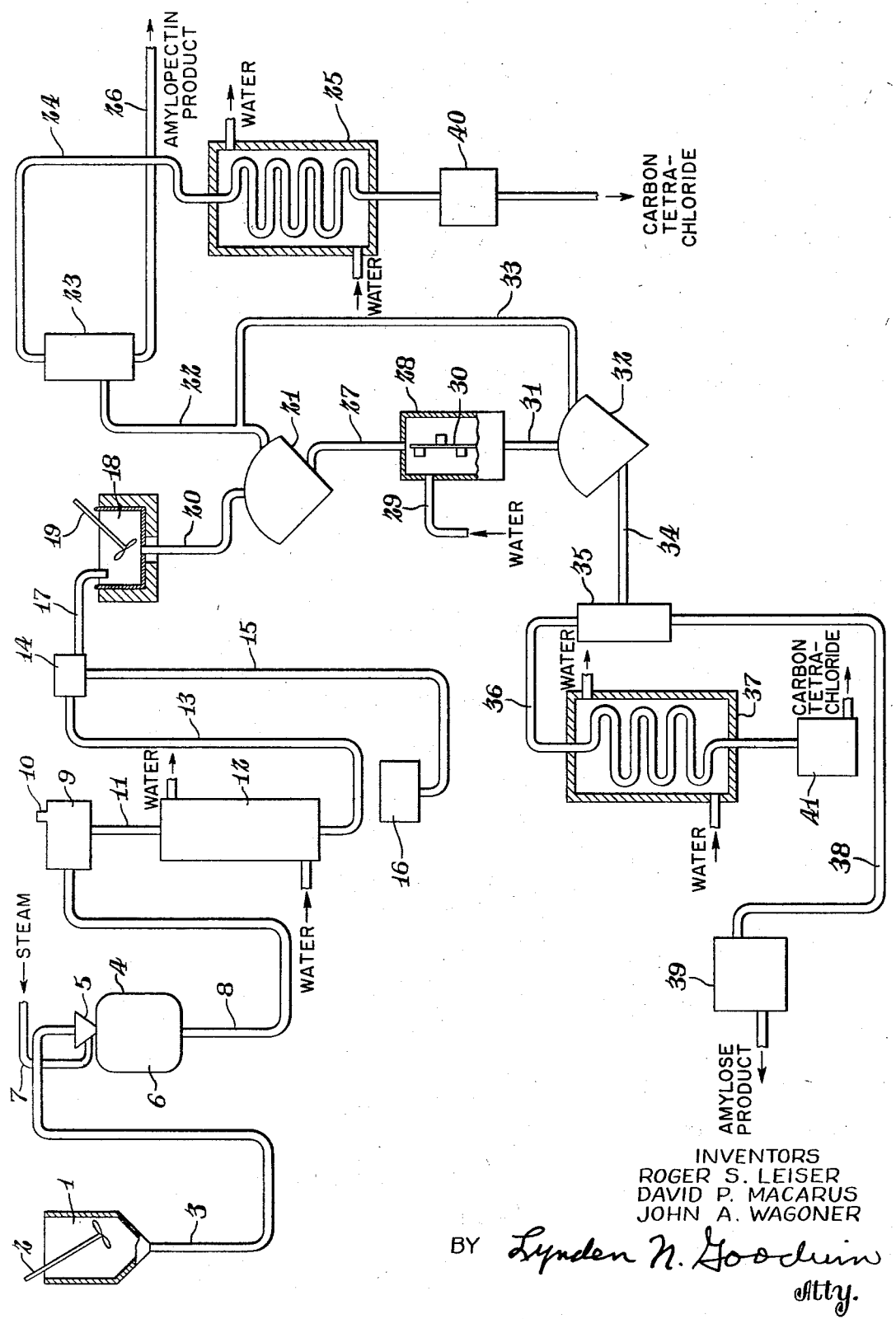

3,323,949
PROCESS FOR SEPARATING AMYLACEOUS MATERIAL INTO AMYLOSE AND AMYLOPECTIN
Roger S. Leiser, Decatur, Ill., David P. Macarus, Chester, Pa., and John A. Wagoner, Mount Zion, Ill., assignors to A. E. Staley Manufacturing Company, Decatur, Ill., a corporation of Delaware
12 Claims. (Cl. 127—71)

Our invention relates to a process for the separation of amylose from starch in which the amylose is precipitated as a complex with carbon tetrachloride. More particularly, our invention relates to a process for removing carbon tetrachloride from amylose.

Ordinary starch is known to consist of two types of polymers of glucose, the linear polymer called amylose (sometimes referred to as the "A" fraction) and the branched chain polymer called amylopectin (sometimes referred to as the "B" fraction). The relative content of amylose and amylopectin varies with the source of starch. For example, it has been estimated that tapioca contains about 17–21% amylose, potato starch 22–25%, ordinary corn starch 22–30%, and so on. The amylose molecule is considered to be a long linear chain of anhydroglucose units. The amylopectin molecular, on the other hand, is considered to be a larger, complex branched chain of tree-like structure with many of the branches themselves having branches and so on.

Amylose has been separated from amylopectin by precipitating amylose as a complex from a fractionation medium consisting of water and a chemical complexing agent for the amylose. For example, U.S. Patent 2,515,096 to Schoch discloses the use of butanol as a chemical complexing agent for amylose. Recently, Pulley in a dessertation to the graduate faculty of Iowa State University of Science and Technology, Ames, Iowa, entitled "Starch and Schardinger Dextrins" (1962) suggested that carbon tetrachloride forms a complex with amylose. To effect the separation of amylose from amylopectin with carbon tetrachloride, an aqueous solution of starch is formed as by heating an aqueous dispersion of starch to temperatures of from about 230 to 375° F. under pressure. Carbon tetrachloride is added to the solution to form a complex with the amylose and the complexed amylose precipitates from the solution. The precipitated material containing the amylose in the form of a complex with carbon tetrachloride is then separated from the aqueous fractionation medium which contains dissolved amylopectin, as by configuration and the amylose is then recovered as by spray drying or roll drying. The amylaceous material recovered by this procedure typically contains upwards of 80% amylose with the balance being amylopectin. For the purpose of this invention we therefore use the word "amylose" to refer to amylaceous material which contains at least 80% amylose. Also, for the purpose of this invention we use the phrase "amylose calculated as amylose" to refer only to amylose which is totally free of amylopectin. The following conditions are preferred for carrying out the process:

(1) Weight proportion of carbon tetrachloride to starch dry substance (15–50) parts of carbon tetrachloride for each 100 parts of starch dry substance.)
(2) pH of solution during precipitation (4.0 to 9.0)
(3) Temperature of solution during precipitation (130 to 200° F.)

By following the method outlined above, ready separation of amylose from amylopectin is accomplished using starch as the starting material. For the purpose of this procedure the term "starch" is used in the generic sense to mean any starch containing a substantial proportion of amylose. The starch may be derived from any suitable source, including corn, wheat, sorghum, potato, tapioca etc. Starch which has been derivatized or modified may also be used. Chiefly because of the large proportion of amylose in the starch, it is advantageous to use starch derived from high amylose corn, that is, corn starch containing more than approximately 50% amylose. Currently available sources of high amylose corn starch include Amylon 55 (approximately 55% amylose) and Amylon VII (approximately 70% amylose).

The principal drawback to the use of carbon tetrachloride in the separation of amylose from amylopectin is that the final product is contaminated with carbon tetrachloride. Even though the greater portion of the carbon tetrachloride is removed by evaporation from the fractionation medium and from the amylose during the separation and the recovery procedures, the recovered amylose still contains minor traces of carbon tetrachloride. Because of the highly toxic nature of carbon tetrachloride, the contaminated amylose is not suitable for use in foodstuffs particularly, and in other materials where the presence of small amounts of toxic material is objectionable.

The general object of our invention is the provision of a method for separating amylose from amylopectin by the use of carbon tetrachloride as a complexing agent for the amylose whereby the separated amylose is free of carbon tetrachloride.

A particular object of our invention is the provision of a process for removing carbon tetrachloride from carbon tetrachloride contaminated amylose.

Other objects and advantages of our invention will be apparent from the specification and the claims which follow.

Generally stated, our invention comprises the following steps: (1) providing an aqueous dispersion of carbon tetrachloride-contaminated amylose, (2) distilling the contaminated amylose at temperatures not in excess of 230° F. to remove the major portion of the carbon tetrachloride, (3) heating the aqueous dispersion at elevated temperatures to form an aqueous solution of the amylose, (4) vaporizing the remaining carbon tetrachloride at elevated temperatures and (5) recovering amylose, free of carbon tetrachloride.

We have found that by following the general method outlined above amylose containing no detectable quantity of carbon tetrachloride can be obtained. While our invention is chiefly directed to removing carbon tetrachloride from amylose which has been separated from amylopectin by the use of carbon tetrachloride, it is applicable generally to any amylose which is contaminated with carbon tetrachloride. We have also found that our process is applicable in removing the last traces of carbon tetrachloride from amylopectin which is contaminated with carbon tetrachloride. Our process is both uneconomical to operate at such low concentrations. As large scale commercial operations.

In carrying out our process, the aqueous amylose dispersion can be prepared by any suitable procedure, as by slurrying carbon tetrachloride-contaminated amylose in water. Principally, to permit efficient distillation of the dispersion but also to permit ease of handling of the dispersion, the total amylose dry solids material in the dispersion, that is to say the sum of the solids of the amylose calculated as amylose and any residual amylopectin, should not exceed 15% by weight based on the weight of the dispersion. Our process is operative using aqueous dispersions having very low amylose solids content, for example even as low as the ¼ of 1%. However, because of the large proportion of water involved it is uneconomical to operate at such low concentrations. As a compromise between economy and ease of operation, it is preferable that the amylose solids content of the dispersion be in the range of from about 3 to about 10% by weight based on the dispersion. The carbon tetrachloride complexed amylose-rich material obtained by separating the amylose fraction from the aqueous fractionation medium may be used as the aqueous dispersion in our process without dilution provided, of course, it does not contain in excess of 15% by weight of dry solids. It is preferable, however, to first wash this material with water to remove residual amounts of amylopectin from the amylose in order to minimize the amount of amylopectin in the final amylose product.

The distillation step of our process used to remove the major portion of the carbon tetrachloride is most conveniently carried out at atmospheric pressure. At atmospheric pressure the carbon tetrachloride is removed as an azeotrope with water at temperatures in the range of from about 150 to about 212° F. depending on the proportion of carbon tetrachloride and water. While lower or higher temperatures at correspondingly reduced or increased pressures may be utilized, it is impractical to do so because of the need to use special equipment. In any situation temperatures should be avoided which are sufficiently high to cause destruction of the carbon tetrachloride. At temperatures above about 230° F. substantial destruction of the carbon tetrachloride takes place, which results in the formation of hydrochloric acid. The hydrochloric acid in turn causes degradation of the amylose. Because of increased viscosities of the dispersion at low temperatures, it becomes difficult to carry out the distillation at temperatures lower than 120° F. when dispersions are utilized which contain more than about 3% amylose. With this in mind, temperatures of from about 140 to about 220° F. are preferable. By utilizing temperatures under 230° F. amylose having as low as 1 to 2 parts per million by weight can be obtained. By removing the maximum amount of carbon tetrachloride in this step the efficiency of the process in obtaining carbon tetrachloride-free amylose and avoiding degradation is insured. Therefore, it is both desirable and convenient to remove the maximum possible amount of carbon tetrachloride before the amylose is heated to elevated temperatures.

The distillation procedure may be carried out in any convenient manner. For example, a continuous column may be utilized or the distillation may be conducted batchwise in a kettle. Subject to the aforestated temperature limitations, the distillation procedure may be carried out at atmospheric pressure or under conditions of reduced or increased pressure. The carbon tetrachloride can be recovered by means of a condenser and the rate of recovery of the carbon tetrachloride can be determined from the amount condensed to determine when a major portion has been removed. When carbon tetrachloride ceases to appear in the condensate it can be judged that the major portion of the carbon tetrachloride has been removed from the amylose. If desired, the condensed carbon tetrachloride can be recycled for use in separating amylose from the amylopectin. At the completion of this step of our process all but minor traces of the carbon tetrachloride have been removed from the amylose.

After completion of the distillation step at temperatures below about 230° F. the amylose dispersion is heated to elevated temperatures to solubilize the amylose and to vaporize from the solution the remaining carbon tetrachloride to obtain amylose substantially free of carbon tetrachloride. While the temperature required to dissolve the amylose will vary depending upon the water solubility of the particular amylose and the concentration of amylose in the aqueous dispersion, we have generally found that in order to remove the last traces of carbon tetrachloride from the amylose solution it is necessary to utilize temperatures above 250° F. It is preferable, of course, to limit the temperature above 250° F. and the time at the temperature in order to avoid degradation of the amylose. Generally, temperatures in the range of 275 to 350° F. are satisfactory in conjunction with times at these temperatures of not more than about 5 minutes.

The amylose can be solubilized and the last traces of carbon tetrachloride can be vaporized in a one-step procedure by heating the aqueous dispersion under pressure at temperatures above 250° F. In the one-step procedure we can employ a continuous pressurized distillation column or a pressurized batch type autoclave apparatus. The heating can be carried out by the admission of steam under pressure or by the use of a heat exchanger. Naturally, in the procedure sufficient water must be present in order to solubilize all of the amylose.

When it is desired to dissolve the amylose in one step and then vaporize the remaining carbon tetrachloride in a subsequent step the amylose dispersion can be brought to above 250° F., for example, in a pressurized autoclave, in a heat exchanger or in an apparatus of the type described in U.S. Patent 3,101,284 to O. R. Etheridge. The thus-formed amylose solution can then be vaporized at temperatures above 250° F. as previously described, or it can be vaporized by flashing the solution to atmospheric pressure to remove the remaining carbon tetrachloride. For optimum effectiveness in removing carbon tetrachloride we prefer to vaporize the final carbon tetrachloride at temperatures above 250° F. as our tests have shown the flashing technique to be less reliable in consistently removing the last traces of carbon tetrachloride from the amylose.

After the purification procedure the amylose can be recovered from the solution by any suitable means, such as roll drying, spray drying or casting the amylose as a film.

The attached drawing illustrates diagrammatically one suitable assemblage of apparatus for carrying out our invention. In the drawing auxiliary equipment, such as pumps, valves, meters and the like, has been omitted in the interest of simplicity since their location would be obvious to the skilled worker.

Referring to the drawing, numeral 1 indicates an open mixing vessel equipped with an agitator 2 in which a dispersion of starch in water is formed. The vessel is connected by a line 3 to a high temperature dispersion-heating device of the type described in the Etheridge patent, which is generally indicated by reference numeral 4.

The heating device 4 comprises a steam jet 5 mounted on a pressurized hold tank 6. The steam jet is connected to a steam manifold 7 and to the line 3. In the jet the starch dispersion enters axially under pressure while the steam enters the throat of the jet from a peripheral nozzle to permit rapid heating of the dispersion to temperatures above 250° F. and to form an aqueous starch solution. The steam jet 5 discharges directly into the hold tank 6 as described in the Etheridge patent. The hold tank is adapted to control the temperature and the pressure of the solution during its retention in the hold tank. The starch solution is flowed from the hold tank through a line 8 to a tank 9, the tank having a vapor outlet 10 on its upper end. In this tank 9 the temperature of the solution is cooled to just below its boiling point by flashing it to atmospheric pressure. The tank 9 is connected by a line 11 to a heat exchanger 12 which comprises a water-cooled coiled tube. In the heat exchanger, the aqueous starch material is cooled to about 140–145° F. The heat exchanger is connected by a line 13 to a closed mixing tank 14. The closed mixing tank is in turn connected by a line 15 to a carbon tetrachloride supply tank 16. Carbon tetrachloride from tank 16 is mixed with the aqueous starch material in the mixing tank 14. The mixing tank is connected by a line 17 to an insulated precipitation vessel 18 equipped with a jacket through which heating or cooling fluids may be circulated in order to regulate the temperature of the starch material, and with an agitator 19 which maintains agitation of the starch material during formation of the carbon tetrachloride-amylose complex. The aqueous material is flowed from the mixing tank 14 through line 17 to the precipitation vessel 18 in which the carbon tetrachloride-amylose complex is formed, typically in from 1 to 3 hours. The precipitation vessel is connected by a line 20 to a closed centrifuge 21. The centrifuge produces an upper aqueous layer and a lower wet slurry layer. The aqueous layer is rich in dissolved amylopectin and the wet slurry layer is rich in solid carbon tetrachloride-complexed amylose.

The aqueous solution of amylopectin is flowed from the centrifuge through a line 22 to a closed autoclave 23 and distilled at atmospheric pressure to remove most of the carbon tetrachloride from the solution. The carbon tetrachloride is removed as an azeotrope with water through a line 24 and is condensed in a condenser 25 whence it flows to a collection vessel 40. To remove substantially all of the carbon tetrachloride from the amylopectin the autoclave is then pressurized and the amylopectin solution is distilled at from 250 to 375° F. to solubilize any undissolved material and to remove the last traces of carbon tetrachloride. The carbon tetrachloride can then be separated from the water and recycled into the process by returning it to the carbon tetrachloride supply tank 16. The amylopectin solution is then flowed through a line 26 to a spray drier (not shown) to obtain a dry product containing a high percentage of amylopectin.

The wet slurry rich in solid carbon tetrachloride-complexed amylose is flowed from the centrifuge through a line 27 to a wash tank 28 having a water inlet 29 and an agitator 30. If the liquid content of the wet slurry is insufficient to permit the slurry to flow through the line 27 to the tank 28 additional water may be added to the slurry in the centrifuge. In any event, the slurry is washed with water in the wash tank 28 to remove residual amounts of amylopectin. The tank 28 is connected by a line 31 to a second centrifuge 32.

The second centrifuge produces an upper aqueous layer containing small amounts of dissolved amylopectin and a lower wet slurry layer rich in solid carbon tetrachloride-complexed amylose. The amylopectin solution is flowed through a line 33 by way of line 22 to the autoclave 23 and treated as previously described.

The wet slurry is flowed from the centrifuge through a line 34 to an autoclave 35 adapted for pressurized distillation. The autoclave 35 is connected by a line 36 to a condenser 37 whence it flows to a collection vessel 41. The water content of the wet slurry may be increased by the addition of water to the slurry in the autoclave or in the centrifuge. In any event, it is necessary that the amylose content (dry substance basis) of the slurry be not in excess of 15% before distillation in the autoclave.

The wet slurry is then distilled at atmospheric pressure and the carbon tetrachloride is removed as an azeotrope with water through line 36 and is condensed in the condenser. The carbon tetrachloride can then be separated from the water and recycled into the process by returning it to tank 16. The distillation at atmospheric pressure is continued until no additional carbon tetrachloride flows into the collection vessel. The autoclave is then pressurized and the slurry is distilled at from 250 to 375° F. to dissolve the amylose and to remove from the solution the last traces of carbon tetrachloride from the amylose. The amylose is then dried, the autoclave being connected by a line 38 to a drier 39, to obtain a dried product rich in carbon tetrachloride-free amylose.

The following examples illustrate the effectiveness of our process in removing carbon tetrachloride from carbon tetrachloride-contaminated amylose. It is understood that the examples are presented for purposes of illustration only and are not intended as a limitation of the invention. In the examples given, high-amylose corn starch containing approximately 55% amylose was utilized.

In the examples the carbon tetrachloride content of the amylose was determined by gas chromatography using the Electron Capture Ionization Detector as described in "Ionization Methods for the Analysis of Gases and Vapors" Analytical Chemistry, volume 33, pages 171–172 (1961). The sample for analysis was prepared by the following procedure.

A 0.250 gram sample of amylose treated to remove carbon tetrachloride by the procedure of the invention is thoroughly mixed with 1 gram 5 N KOH solution, 2 grams distilled water and 1 gram hexane. The mixture is centrifuged and an upper hexane layer and a lower aqueous layer are formed. The layers are separated.

A 1 microliter portion of the hexane layer is used as a sample.

The method is sensitive enough to detect 0.01 p.p.m. of carbon tetrachloride. Amylose containing no more than 0.01 p.p.m. of carbon tetrachloride is considered to be substantially free of carbon tetrachloride.

*Example I*

This example is offered to illustrate our process for separating amylose from amylopectin by precipitating the amylose as a complex with carbon tetrachloride and then removing the carbon tetrachloride from the amylose. In the procedure of the example the solubilization of the amylose and the vaporization of the last traces of carbon tetrachloride from the solution are accomplished in a one-step heating procedure at elevated temperature.

An aqueous dispersion was prepared by mixing 2398 grams of starch dry substance with 8250 grams of water. This dispersion was converted to an aqueous solution by passing it through a coiled heat exchanger in a constant temperature oil bath to a pressurized collection vessel. A solution temperature of 310° F. was reached in the heat exchanger. The solution was then transferred to an insulated vessel equipped with a heating means. Upon removal to atmospheric pressure, the temperature of the solution rapidly dropped to just below the boiling point of the solution. The solution was then slowly cooled to 145° F. and 19,100 grams of water having a temperature of 145° F. were added to the solution. To the solution were then added 408 grams of carbon tetrachloride. The solution was then gently stirred for a period of about 1 hour during which period a precipitate rich in carbon tetrachloride-complexed amylose was formed. During the 1-hour period the temperature of the solution was maintained at about 145° F.

The precipitate was then separated from the fractionation medium by centrifuging at 140° F. using a Fletcher standard centrifuge rotating at 1560 r.p.m. A wet centrifuge slurry weighing 8575 grams was separated from the fractionation medium. The wet amylose was then slurried with 2572 grams of water to wash it and again centrifuged to obtain a second wet slurry weighing 6215 grams. A 3110 gram portion of the second slurry containing 15% by weight amylose dry substance was then mixed with 4515 grams of water. This material was transferred to an autoclave equipped with a condenser and distilled at atmospheric pressure at temperatures gradually using from 150 to about 210° F. The distillation was terminated when additional carbon tetrachloride no longer appeared in the condensate. The autoclave was then pressurized, and the distillation was continued at about 275° F. until the original liquid volume was reduced by approximately 10%. The material was then transferred to a drum drier and dried to obtain 350 grams of solid material having an amylose content calculated as amylose of 80.8%. No carbon tetrachloride was detected in the amylose.

*Example II*

The procedure of Example I was repeated in all essential details. Analysis showed no detectable carbon tetrachloride in the recovered material.

*Example III*

This example is offered to illustrate the procedure of our invention for removing carbon tetrachloride from amylose. In the procedure the amylose is solubilized at elevated temperatures in one step and the last traces of carbon tetrachloride are subsequently removed by vaporization in a separate step by flashing the amylose solution to atmospheric pressure.

7715 grams of a wet slurry was obtained by centrifuging carbon tetrachloride-complexed amylose as shown in Example I. The slurry had an amylose dry substance content of 8.0%. This material was distilled at atmospheric pressure in a 12 liter flask equipped with a condenser. The distillation was discontinued when carbon tetrachloride ceased to appear in the condensate. The distilled material was then heated by passing it through a heat exchanger comprising a continuous coil in a constant temperature environment to dissolve the amylose. The temperature of the solution formed in the heat exchanger was approximately 320° F. The solution was then passed from the heat exchanger to an open collection vessel. On flashing to atmospheric pressure the solution temperature dropped to approximately 210° F. The amylose solution was then drum dried to obtain 450 grams of solid material having an amylose content calculated as amylose 89.7%. Analysis showed no carbon tetrachloride in the amylose.

*Example IV*

The procedure of Example III was repeated in all essential details. The recovered material had an amylose content calculated as amylose of 90.1%. Analysis showed the amylose to be substantially free of carbon tetrachloride.

Since many embodiments may be made of this invention and since many changes may be made in the embodiments described, the foregoing is to be interpreted as illustrative only, and the invention is defined by the claims appended hereto.

Now having described our invention, what we claim is:

1. A process for the removal of carbon tetrachloride from amylose containing carbon tetrachloride which comprises providing an aqueous dispersion of carbon tetrachloride-contaminated amylose, the said dispersion containing a small amount and up to 15% amylose dry solids by weight based on the dispersion, distilling the said aqueous dispersion at temperatures not in excess of about 230° F. to remove a major portion of the carbon tetrachloride, further heating the said distilled dispersion at temperatures above 250° F. under superatmospheric pressures to dissolve the amylose and to remove the remaining carbon tetrachloride from the dissolved amylose, the time and the temperature above 250° F. being limited to avoid degradation of the amylose and recovering amylose substantially free of carbon tetrachloride.

2. The process of claim 1 wherein the dispersion contains from about 3 to about 10% amylose dry solids.

3. The process of claim 1 wherein the temperature of distillation ranges from about 140 to about 220° F.

4. A process for the removal of carbon tetrachloride from amylose containing carbon tetrachloride which comprises providing an aqueous dispersion of carbon tetrachloride-contaminated amylose, the said dispersion containing a small amount and up to 15% amylose dry solids by weight based on the dispersion, distilling the said aqueous dispersion at temperatures not in excess of about 230° F. to remove a major portion of the carbon tetrachloride, further heating the said distilled dispersion at temperatures above 250° F. under superatmospheric pressures to form a solution of amylose in water, heating the said solution at temperatures above 250° F. under pressure to vaporize the remaining carbon tetrachloride, the time and the temperature above 250° F. being limited to avoid degradation of the amylose, and recovering amylose substantially free of carbon tetrachloride.

5. The process of claim 4 wherein the dispersion contains from about 3 to about 10% amylose dry solids.

6. The process of claim 4 wherein the distillation to remove the major portion of the carbon tetrachloride is carried out at from about 140 to about 220° F.

7. A process for the removal of carbon tetrachloride from amylose containing carbon tetrachloride which comprises providing an aqueous dispersion of carbon tetrachloride contaminated amylose, the said dispersion containing a small amount and up to 15% amylose dry solids by weight based on the dispersion, distilling the said aqueous dispersion at temperatures not in excess of about 230° F. to remove a major portion of the carbon tetrachloride, further heating the said distilled dispersion under superatmospheric pressures at temperatures above 250° F. to form a solution of the amylose in water, the time and the temperature above 250° F. being limited to avoid degradation of the amylose, flashing the said solution to atmospheric pressure to vaporize the remaining carbon tetrachloride and recovering amylose substantially free of carbon tetrachloride.

8. The process of claim 7 wherein the dispersion contains from about 3 to about 10% amylose solids.

9. The process of claim 7 wherein the distillation is carried out at from about 140 to about 220° F.

10. The process for continuously recovering amylose from starch which comprises providing an aqueous solution of starch, the said solution having a temperature ranging from about 130 to about 200° F. and a pH of from about 4.0 to about 9.0, combining carbon tetrachloride with the solution, the amount of carbon tetrachloride being from about 15 to about 50 parts by weight for each 100 parts by weight of starch dry substance, maintaining the temperature of the solution at from about 130 to about 200° F. and the pH of the solution at from about 4.0 to about 9.0 to effect precipitation of amylose in the form of a complex with carbon tetrachloride, separating the carbon tetrachloride-complexed amylose from the solution, forming an aqueous dispersion in water of the carbon tetrachloride complexed amylose, the said dispersion containing a small amount and up to 15% amylose dry solids by weight based on the dispersion, distilling the said dispersion at temperatures not in excess of about 230° F. to remove a major portion of the carbon tetrachloride, collecting the removed carbon tetrachloride, further heating the said distilled dispersion at temperatures above 250° F. under superatmospheric pressures to dissolve the amylose and to remove the remaining carbon tetrachloride from the dissolved amylose, the time and the temperature above 250° F. being limited to avoid degradation of the amylose, collecting the removed carbon tetrachloride, recycling the removed carbon tetrachloride to the process, and recovering amylose substantially free of carbon tetrachloride.

11. The process of recovering amylose from starch which comprises providing an aqueous solution of starch, the said solution having a temperature ranging from about 130 to about 200° F., and a pH of from about 4.0 to about 9.0, combining carbon tetrachloride with the solution, the amount of carbon tetrachloride being from about 15 to about 50 parts by weight for each 100 parts by weight of starch dry substance, maintaining the temperature of the solution at from about 130 to about 200° F. and the pH of the solution at from about 4.0 to about 9.0 to effect precipitation of amylose in the form of a complex with carbon tetrachloride, separating an aqueous dispersion of the carbon tetrachloride-complexed amylose from the solution, the said dispersion containing not more than 15% amylose dry solids by weight based on the dispersion, distilling the said dispersion at temperatures not in excess of about 220° F. to remove major portion of the carbon tetrachloride, further heating the said distilled dispersion at temperatures above 250° F. under superatmospheric pressures to dissolve the amylose and to vaporize the remaining carbon tetrachloride in the dissolved amylose, the time and the temperature above 250° F. being limited to avoid degradation of the amylose and recovering amylose substantially free of carbon tetrachloride.

12. A process for the removal of carbon tetrachloride from an aqueous solution of amylopectin containing carbon tetrachloride and a minor portion and up to 15% by weight amylose which comprises distilling the said solution at temperatures not in excess of about 230° F. to remove a major portion of the carbon tetrachloride, heating the said solution at temperatures above 250° F. under superatmospheric pressures to dissolve the undissolved amylose and to remove the remaining carbon tetrachloride therefrom, the time and the temperature above 250° F. being limited to avoid degradation of amylopectin and recovering amylopectin substantially free of carbon tetrachloride.

References Cited

UNITED STATES PATENTS

| | | | |
|---|---|---|---|
| 3,046,161 | 7/1962 | Montgomery et al. | 127—71 |
| 3,222,220 | 12/1965 | Wuzburg et al. | 127—71 |
| 3,252,836 | 5/1966 | Anderson et al. | 127—71 |

OTHER REFERENCES

Pulley A. O.: Ph. D. Thesis, I Starch and Schardinger Dextrins, Complete with Hydrophobic Compounds, II Higher Schardinger Dextrin Homologs, Iowa State University of Science & Technology, 1962, page 9 of part I relied upon.

MORRIS O. WOLK, *Primary Examiner.*

E. G. WHITBY, *Assistant Examiner.*